Nov. 16, 1948.    F. B. LLEWELLYN    2,453,716
HIGH-FREQUENCY TANK CIRCUITS
Original Filed Jan. 15, 1938

INVENTOR
F. B. LLEWELLYN
BY
H. O. Wright
ATTORNEY

Patented Nov. 16, 1948

2,453,716

UNITED STATES PATENT OFFICE 2,453,716

HIGH-FREQUENCY TANK CIRCUITS

Frederick B. Llewellyn, Verona, N. J., assignor to Bell Telephone Laboratories, Incorporated, New York, N. Y., a corporation of New York Original application January 15, 1938, Serial No. 185,139. Divided and this application April 2, 1941, Serial No. 386,461

3 Claims. (Cl. 178—44)

This invention relates to improved electrical resonators or tank circuits suitable for precisely fixing the frequency of single frequency high frequency oscillatory circuits.

This application is a division of my copending application entitled "Frequency stabilization at ultra high frequencies," Serial No. 185,139, filed January 15, 1938 which issued November 11, 1941, as Patent 2,262,020.

A principal object of the invention is to provide tank circuits which will have greater precision under actual circuit operating conditions than tank circuits of the prior art.

Another object is to provide precise frequency stabilizing devices which are simple to manufacture and adjust.

A further object is to produce tank circuits in which the current distribution is substantially uniform over the current carrying surfaces thereof.

Another object is to provide tank circuits, which are inherently electrically loosely coupled to the circuits, the frequency of which are to be stabilized.

Other and further objects will become apparent during the course of the following description and in the appended claims.

A particular feature of the tank circuits of this invention is that they are arranged to be electrically analogous to a three-element resonant circuit rather than a simple two-element circuit. As will appear in the course of the following description by appropriately proportioning the devices, an electrically loose coupling between the stabilizing (tank) circuit and the stabilized circuit can be achieved and the full advantage of the extreme precision inherent in the tank circuit per se can thereby be realized.

Figure 1:
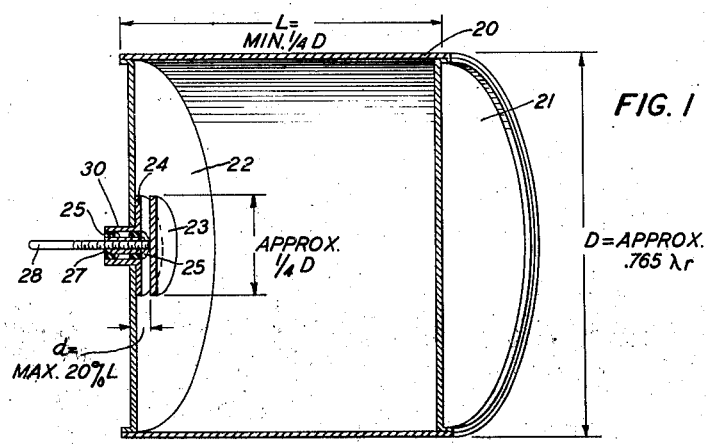
Figure 2:
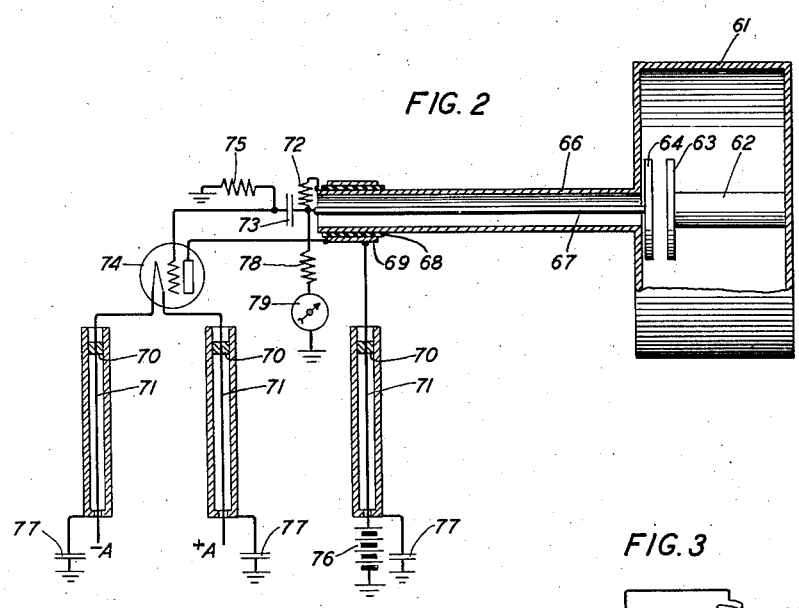
Figure 3:
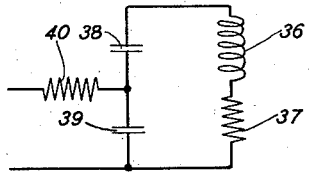

The features of the invention will be more readily understood in connection with the accompanying drawings in which:

Fig. 1 shows in a perspective cross-sectional view one preferred embodiment of the invention, comprising a vessel enclosing a coupling member only;

Fig. 2 shows in partial cross-section another preferred embodiment, comprising a vessel enclosing a coupling member and additional conducting members and includes also a schematic representation of an external single frequency oscillatory circuit electrically coupled to the aforementioned preferred embodiment so that the latter will stabilize the frequency of oscillation of the said circuit; and Fig. 3 shows an equivalent electrical network of the tank circuit devices of Figs. 1 and 2.

In more detail and with reference to Fig. 1 the form of tank circuit of this invention there illustrated in perspective cross-sectional view comprises a right circular cylinder 20 closed at both ends by flat sheet metal discs 21 and 22. Through the center of the left disc 22 a tube 30 projects which may for mechanical strength and to insure good electrical contact between the tube 30 and the end of the tank 22 carry a flange 24. Insulating rings 25 centrally support the metallic bushing 27 in tube 30. The inner surface of bushing 27 is threaded to accommodate threaded rod 28, at the right end of which coupling disc 23 is affixed by its center. By turning rod 28 the separation and therefore the capacitance between disc 23 and flange 24 or the end 22 may be varied.

Tube 30 and rod 28 may be extended to the left to any convenient distance, suitable insulators being introduced to maintain rod 28 centrally within tube 30, in which case they may form a concentric pair of conductors the properties of which are, of course, well known.

All parts of the tanks of this invention except obviously the insulators should be made of highly conductive material such as copper. All joints between parts should be tightly made and are preferably soldered or welded, and contiguous surfaces should be clean and untarnished so that good electrical contact will be effected and leakage and dissipation of energy prevented. All surfaces within the tank should be clean and bright since the high frequency currents with which the tanks are to be used for frequency stabilization will be concentrated on these surfaces.

To prevent oxidation, the surfaces when clean and bright may be gold-plated or they may be lacquered, though in the latter case some dielectric loss may be introduced. Oxidation and corrosion of the conducting surfaces of an experimental tank circuit of the invention have been observed to decrease the index of electrical efficiency "Q" of the tank to less than twenty per cent of its original value. The above-suggested precautions are therefore of substantial importance. Proportions of the length L, the diameter D and the coupling distance $d$ relative to each other and the wave-length $\lambda$ which will be found appropriate for most practical applications are indicated in Fig. 1.

As stated above, the schematic circuit of Fig. 3 represents an electrical circuit which may be an equivalent electrical network for both species of tanks as represented by Figs. 1 and 2 of the drawings accompanying this application. As applied to the species of Fig. 1, the resistance 40 represents the resistance of the tube 30 and the rod 28 forming the connecting conductors to the tank circuit. Capacity 39 is that existing between the coupling disc 23 and the near end 22 of the tank circuit and capacity 38, inductance 36 and resistance 37 represent the capacity between disc 23 and the more remote inner surfaces of the closed cylinder 20 and the inductance and resistance of the inner surfaces of the tank generally.

While, strictly speaking, capacitance 38, inductance 36 and resistance 37 are distributed, each unit of area of the tank's internal surface having a particular capacitance relative to the coupling disc 23 and each linear unit of the tank's internal surface along the paths of current flow contributing increments of resistance and inductance, for many practical purposes, including those of this invention, it has been found that these properties may be considered as lumped and the impedance may be considered, within a degree of accuracy satisfactory for the practical uses proposed, to be equivalent to that indicated in Fig. 3.

In Fig. 1 the coupling disc 23, as above described, is supported by a threaded rod 28 held by a threaded bushing 27 so that by turning the rod 28 the capacitance between the disc 23 and the near end of the tank 22 represented by capacitance 11 in the schematic circuit of Fig. 3 may be adjusted.

From the standpoint of maintenance it may be frequently deemed more advisable to fix definitely the position of the coupling disc. Constructions adapted to this end can readily be devised by those skilled in the art and a particular construction of this kind is described in my above-mentioned copending application and illustrated in Fig. 4 of the drawings thereof.

With regard to the electrical properties which should be imparted by design to tank circuits of the invention a number of somewhat conflicting requirements must be taken into consideration. For sharp frequency control it is desired that the constituent reactances which are combined to produce the controlling resonance effect should themselves be impedances of inherently large magnitude so that steep impedance-frequency characteristics will be obtained. With such a control a very large impedance change occurs for a small frequency variation and precise frequency control may therefore be more readily effected.

On the other hand, the efficiency of the usual forms of electrical oscillator, as for example, those employing vacuum tubes is definitely limited by the impedance of the frequency stabilizing circuit associated therewith.

Furthermore, if a sharply resonant control circuit of high impedance is coupled directly to the oscillator, it is practically impossible to maintain the stabilizing advantages of the sharp resonance because of the damping introduced by the oscillator circuit.

These difficulties may be substantially eliminated by loosely coupling the control circuit electrically with the oscillator. This involves effectively stepping down the high impedance of the control circuit before making connection with the oscillator circuit. Since the mutual impedance coupling the tank circuit with the oscillator circuit is thereby made small with respect to the component impedances contributing to the resonant effect of the tank circuit, the dissipative tendencies of the oscillator circuit will only very slightly affect the resonance of the tank circuit. Of course, for efficient operation of the oscillator the impedance presented thereto by the coupling to the tank circuit should be of appropriate magnitude.

Thus, to accomplish these results, tank structures of the general class exemplified by Figs. 1 and 2 of the accompanying drawings have been devised. With respect to Fig. 1, as previously pointed out, the coupling disc 23 is positioned in relatively close proximity to the near end of the tank 22 so that the input circuit is shunted by a relatively large capacitance having at high frequencies a relatively low impedance. Referring to Fig. 3 capacitance 39 is thus made relatively much larger than capacitance 38 and its impedance is therefore relatively much less. The combination of capacitances 38 and 39 in series and inductance 36 are such that at some point near the resonant frequency of the combination the impedance across capacitance 39 will be suitable for the operation of the associated oscillator with the desired degree of stability and efficiency. As the impedance of capacitance 39 is decreased from the particular value for a given oscillator the efficiency of the oscillator will be impaired but its stability will be improved until a point is reached at which the capacitance is so large (and its impedance is so small) that oscillations are prevented.

It should be apparent from the above discussion that by properly choosing the value of capacitance 39 and electrically coupling the resonant circuit through this capacitance loosely to the oscillator the full steepness of slope of the impedance curve of the resonant circuit may be made effective and at the same time an impedance suitable for efficient operation of the oscillator may be obtained. The arrangement has the further very substantial advantage, as stressed above, of rendering the tank circuit virtually independent of dissipation in the oscillatory circuit to which it is coupled.

The resonant frequency of a tank circuit of the type exemplified by Fig. 1 is determined almost entirely by its diameter. The length affects primarily the magnitude of the components of the resonant impedance. If the length is made too small, difficulty in obtaining a sufficiently loose electrical coupling between the tank circuit and the associated oscillator while still retaining a mutual impedance suitable for operation with the associated oscillator will be experienced.

Tests have indicated that the length should generally be at least half the diameter, but that in some instances it may be satisfactory to employ lengths as short as one-fourth of the diameter. In other instances, to obtain higher impedance components and looser electrical coupling between the tank and the circuit to be stabilized lengths equalling or exceeding the diameter may be employed.

Also at extremely high frequency it may, from the standpoints of size and ease of construction, be desirable to employ a length equal to or exceeding the diameter. At such frequencies it may in extreme cases be desirable to deliberately induce secondary resonances at frequencies above the primary resonant frequency and to employ one of them for frequency stabilization, so that the dimensions of the tank will not be so small that they may not, as a practical matter, be conveniently constructed. In such cases the length will in general substantially exceed the diameter. For normal operation the tank diameter should be approximately 0.765 times the free-space wavelength of the resonant frequency desired. The number 0.765 is the first root of the Bessel function $J_0$ $$\left(\frac{2\pi r}{\lambda}\right)$$

An experimental tank of the type exemplified in Fig. 1 was found to operate satisfactorily with a coupling disc having a diameter of approximately one-fifth the diameter of the enclosing vessel. Other experiments indicated that the operation of this type of hollow tank was not critically affected by the size of the coupling disc.

The form of tank illustrated in Fig. 1, that is, a right circular cylinder closed at each end by a disc and provided by a coupling disc concentrically supported near and parallel to one end has a number of outstanding advantages. Of these its mechanical symmetry providing substantially an even distribution of current over the current carrying surfaces of the tank, is one, the ease with which it may be mechanically constructed is another, and a third is that its two dimensions, namely diameter and length, control almost independently its two important electrical characteristics, which are the fundamental frequency of resonance and the magnitude of the impedance components producing resonance, respectively.

A tank circuit of the general type exemplified by Fig. 1 having virtually any shape of cavity and coupling disc would, however, have resonant properties. A rectangular tank, for example, would have three fundamental frequencies, each determined by one of its major dimensions, namely width, height and length. If made in the form of a cube, these three dimensions would, of course, coincide and such a structure would be well adapted to use as a frequency controlling device. Such a tank would, however, lack the symmetry of coupling of the tank of Fig. 1 and moreover would be more difficult to construct accurately than the closed right circular cylinder.

The coupling element may vary widely in shape or size, subject to the following requirements: First, the capacitance of the element to one surface of the tank should establish an impedance of approximately the desired magnitude for operation with the external circuit; second, its capacitance to the other surfaces of the tank should be substantially less than the first-mentioned capacitance; and, third, mechanical symmetry should preferably be maintained so that disturbing irregularities will not be introduced into the resonant phenomena obtained.

For the more usual types of tank circuits having rods and auxiliary discs within the enclosing vessel, in addition to the coupling member, the dimensions of the enclosing vessel for a particular resonant frequency may be varied over wide ranges with relatively small change in operating efficiency. It should be noted, however, that for particular resonant frequency and impedance values optimum dimensions may be mathematically derived. In such tank circuits mechanical symmetry of structure such as to produce a substantially uniform distribution of energy and current flow throughout the tank is also highly desirable, particularly since the current densities over the surfaces of the auxiliary conducting members enclosed within the tank vessel are substantially greater than for the general type of tank exemplified by Fig. 1.

Considerations of mechanical size indicate that tanks of the general type of Fig. 1 will ordinarily be used at very high frequencies since, for example, at 300 megacycles (one meter wave-length) the tank diameter will be approximately 76.5 centimeters for a tank as illustrated in Fig. 1.

The second species of tank exemplified by Fig. 2 of the accompanying drawings may also be readily designed to employ the principle of loosely coupling the tank circuit to the oscillatory circuit.

In Fig. 2 the tank circuit comprising the right circular cylindrical vessel 61, coupling disc 64, auxiliary disc 63 and central supporting tube or rod 62 may also be represented schematically by the circuit of Fig. 3, where capacitance 39 in this instance represents the capacitance between the coupling disc 64 and the left end of the tank vessel 61, capacitance 38 represents the capacitance between discs 63 and 64, inductance 36 represents the combined inductance of the rod or tube 62 and the internal surface of the tank vessel 61 and resistance 37 represents the combined resistance of tube 62 and the internal surfaces of vessel 61. Coupling disc 64 should, of course, be positioned with respect to the left end of the enclosing vessel 61 so that its capacitance thereto substantially exceeds its capacitance with respect to the disc 63.

Because of the additional inductance contributed by the central rod or tube 62 and the increased capacitance contributed by the presence of auxiliary disc 63, the over-all physical dimensions of the form of tank exemplified by Fig. 2 are, in general, approximately one-fifth those of the corresponding type of tank exemplified by Fig. 1 for operation at a particular frequency.

The practical significance of this is that the tank circuits of the type exemplified by Fig. 2 will have favorable mechanical dimensions over a frequency range substantially below that over which it may be convenient, considering bulk, to employ the type of tank circuit of Fig. 1. Conversely, there is an upper frequency limit of practical usefulness for tank circuits of the type illustrated by Fig. 2, because these dimensions at very high frequencies become very small and its resistive component represented by resistance 37 of Fig. 3 becomes unduly large, particularly that portion of the resistive component contributed by the smaller central supporting tube 62 of Fig. 2 over the surface of which a relatively heavy concentration of current will result. Of course, if the resistive component becomes large, the index of electrical efficiency, commonly designated "Q," of the circuit is reduced and the effectiveness of the resonant circuit as a frequency stabilizer is substantially prejudiced by the damping of the resistive component.

Tanks of the type exemplified by Fig. 1 are inherently more efficient electrically because the conducting surfaces have a much larger area for a given resonant frequency and there are no conductive members other than the coupling disc enclosed within the outer vessel. The latter feature is important too, since eddy currents are established in all conductors within the vessel by the radiant energy filling the tank while in operation. Furthermore, the relatively large concentration of current on the internal rod or tube of the type of tank exemplified by Fig. 2 does not take place in the type of tank exemplified by Fig. 1.

It should be noted that both of the species of tanks exemplified by Figs. 1 and 2 of the accompanying drawings provide symmetrical coupling and uniform distribution of energy and current throughout the tank structure as well as electrically loose capacitative coupling between the resonant circuit of the tank and the external circuits to which they may be connected.

Obviously, the tank circuits of this invention may be connected to oscillator circuits in any of the well-known ways in which frequency stabilizing devices, such, for example, as piezoelectric crystals are employed, though, of course, the frequencies at which the tank circuits of this invention are employed are generally much higher than those for which piezoelectric crystals may be conveniently used, in view of the extremely small dimensions which the crystals would have to have in order to be resonant at the required frequencies. This is particularly true, obviously, for the type of tank circuit exemplified by Fig. 1, which will still have reasonable mechanical dimensions at wave-lengths considerably shorter than one meter.

The structures above described are illustrative of the principles of the invention. Numerous embodiments of these principles will occur to those skilled in the art and no attempt has here been made to exhaustively cover such embodiments. The scope of the invention is defined in the following claims.

What is claimed is:

1. A high frequency oscillatory circuit comprising a substantially closed cylinder, a capacitor comprising two separated plates near one end of said cylinder, means for connecting the inner surface of said near end of said cylinder to an external circuit, two metallic supporting rods one of said rods directly connecting the more central capacitor plate to the far end of said cylinder, the other of said rods supporting the other of said capacitor plates and extending through but insulated from the near end of said cylinder, said second capacitor plate being supported in such proximity to the said near end of said cylinder that its capacity therewith greatly exceeds its capacity to the first of said capacitor plates, its capacities with respect to the first of said capacitor plates and the said near end of said cylinder being such that said capacities will be electrically resonant with the combined inductance of the first of said supporting rods and that of the internal surface of said cylinder at a predetermined high frequency.

2. A device for precisely fixing the frequency of a single-frequency high-frequency oscillatory system, said device comprising a rod of conductive material enclosed within a vessel of conductive material, one end of said rod being conductively joined to one end of said vessel, a first plate of conductive material conductively joined to the other end of said rod but insulated from said vessel, a second plate of conductive material disposed within said vessel but insulated therefrom and from the rod and first stated plate, said second plate being positioned to have a capacity with respect to the other end of said vessel which substantially exceeds its capacity with respect to the first plate, the above-stated plates, rod and vessel being proportioned and positioned to form an electrical circuit resonant at a particular predetermined high frequency, and a conductor electroconductively connected to said second plate and passing directly through but electrically insulated from the said other end of said vessel whereby a loose purely capacitative electrical coupling to the resonant circuit within said vessel can be obtained.

3. A high impedance, sharply resonant, frequency stabilizing device for precisely fixing the frequency of a single-frequency high-frequency oscillatory system at a particular predetermined single frequency comprising a resonant electrical circuit which includes the inner surface of a vessel of conductive material enclosing the circuit, a rod of conductive material connected to said vessel at one end only and two capacitor plates of conductive material, one of said plates connecting to the free end of said rod, the other plate being disposed between the first-mentioned plate and a particular internal surface of said vessel, to have a substantially greater capacity with respect to said particular surface of said vessel than with respect to the said first plate, a conductor connecting to said second-mentioned plate and passing directly therefrom through the said particular surface of said vessel but insulated from the vessel, the said vessel, said rod, said plates and said conductor being symmetrically proportioned and positioned with respect to the main longitudinal axis of said device whereby both a loose purely capacitative coupling to and uniform distribution of current over the conductive surfaces included in said resonant circuit can be obtained.

FREDERICK B. LLEWELLYN.

REFERENCES CITED

The following references are of record in the file of this patent:

UNITED STATES PATENTS

| Number | Name | Date |
| --- | --- | --- |
| 2,103,457 | Hansell | Dec. 28, 1937 |
| 2,106,768 | Southworth | Feb. 1, 1938 |
| 2,106,769 | Southworth | Feb. 1, 1938 |
| 2,109,880 | Dow | Mar. 1, 1938 |
| 2,124,029 | Conklin | July 19, 1938 |
| 2,143,891 | Lindenblad | Jan. 17, 1939 |
| 2,197,124 | Conklin | Apr. 16, 1940 |
| 2,262,020 | Llewellyn | Nov. 11, 1941 |

OTHER REFERENCES

Proceedings of I. R. E., October, 1938, page 1318.